United States Patent
Zeigler et al.

(10) Patent No.: US 12,124,778 B1
(45) Date of Patent: Oct. 22, 2024

(54) METHOD FOR IMPROVING THE SIMULATION OF COMPLEX STOCHASTIC SYSTEMS

(71) Applicant: RTSync Corp., Chandler, AZ (US)

(72) Inventors: Bernard Zeigler, Chandler, AZ (US); Doohwan Kim, Chandler, AZ (US)

(73) Assignee: RTSYNC CORP., Chandler, AZ (US)

( * ) Notice: Subject to any disclaimer, the term of this patent is extended or adjusted under 35 U.S.C. 154(b) by 0 days.

(21) Appl. No.: 18/350,963

(22) Filed: Jul. 12, 2023

(51) Int. Cl.
*G06F 30/20* (2020.01)

(52) U.S. Cl.
CPC .................................. *G06F 30/20* (2020.01)

(58) Field of Classification Search
CPC ....................................................... G06F 30/20
USPC ............................................................... 703/6
See application file for complete search history.

(56) References Cited

U.S. PATENT DOCUMENTS

| | | | |
|---|---|---|---|
| 11,308,025 B1 * | 4/2022 | Assadikhomami | G06F 9/44505 |
| 2007/0089075 A1 * | 4/2007 | Ward | G06F 30/3323 716/106 |

OTHER PUBLICATIONS

Capocchi et al. (Discrete-Event Simulation Model Generation based on Activity Metrics, 16 pages. (Year: 2020).*
Seo et al. (DEVS Markov Modeling and Simulation: Formal Definition and Implementation, (12 pages)). (Year: 2018).*

* cited by examiner

*Primary Examiner* — Andre Pierre Louis
(74) *Attorney, Agent, or Firm* — Arch & Lake LLP

(57) ABSTRACT

This invention expresses the stochastic system in a tree branching structure form. Successive nodes of the tree each contain a finite state model of the system which maintains information of the state of the system attained to that point and the branches represent decisions made that take the system to subsequent nodes. The branching tree structure affords a general method of approximating a stochastic system in a form that affords specific methods of speeding up the computations required to predict its behavior. The methods exploit the nature of the finite state representation to efficiently identify the state and output transitions associated with branching, the branching probabilities. Moreover, once a (state, branch) pair have been encountered and the resulting (state, output) pair have been computed by simulation, the next time this (state, branch) pair is encountered the resulting (state, output) is found by table lookup, a faster process than simulation.

18 Claims, 6 Drawing Sheets

NB = Number of Samples needed to identify branch probabilities
TB = Time to get a sample for branching
NL = Number of Samples needed to identify leaf outcome probabilities
TL = Time to get a sample for leaf probability outcome From prior analysis statistical significance requires number of samples dependent on smallest size of probability of interest and % confidence For same significance level we set NB=NL Ratio = NL*TL/NB*TB = TL/TB For baseball use case
TB = 1 batter outcome
TL = 30 batter outcomes
=> Ratio = 30

FIG. 9

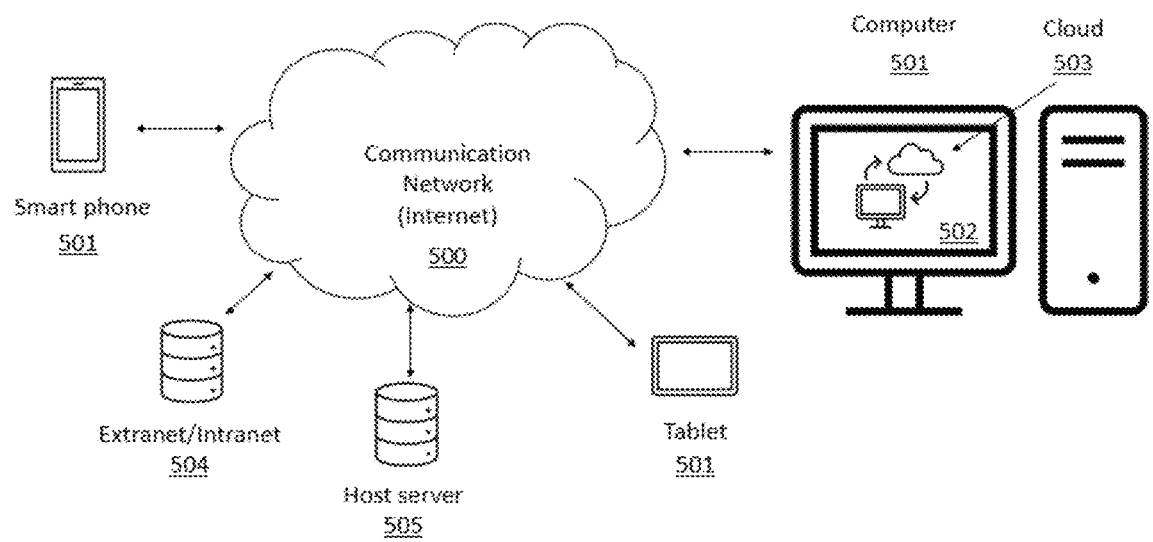

FIG. 10

METHOD FOR IMPROVING THE SIMULATION OF COMPLEX STOCHASTIC SYSTEMS

BACKGROUND

1. Field of Invention

The present invention relates to improving a simulation with uncertainty quantification in a computer simulation.

2. Background of the Art

Conventionally, in a computer simulation that includes a stochastic element, Monte Carlo simulation is used in which a statistical execution result is obtained by repeatedly executing a simulation. When performing a Monte Carlo simulation using a computer system for a large-scale scenario that assumes the behavior of various configuration systems in the real world, the scale and complexity of the scenario (for example, the number of units, parameters, and statistics of the system) demand very long execution times.

Because complex stochastic systems have multiple paths they can follow and because the decisions of which paths to take are random, complex stochastic systems take a long time to simulate. This makes it hard to predict their behavior with an acceptable degree of certainty in a reasonable time.

A simulation execution method that shortens the total execution time of a simulation by using the information found in the first simulation execution to improve the efficiency of the second and subsequent executions is known. If the occurrence time of an event that became known by the first execution is acquired and there is no stochastic element up to that time, the system can re-use the information obtained of the event that became known when executing the second and subsequent times. Thus, the total simulation execution time is shortened.

In the simulation execution method, some computation processing during the period when detailed simulation is unnecessary can be omitted, but simulation models of various units appearing in the scenario are generated for all units, and the execution result of the scenario is obtained. It is necessary to process a simulation for prediction. For this reason, there is a problem that the contribution of the shortening effect to the total execution time of the entire simulation is small.

SUMMARY

The present invention has been made to solve the problems and aims to reduce the total execution time of the simulation, thus increasing the performance of the system. The present invention expresses the stochastic system in a tree branching structure form. Here successive nodes of the tree each contain a finite state model of the system which maintains information of the state of the system attained to that point and the branches represent decisions made that take the system to subsequent nodes.

To solve the problem, current methods of stochastic system simulation work with the system representation as given and iteratively track its state from that initially given until a final state or condition of interest has been reached. They must perform a large number of replications of such sample trajectories to achieve statistical significance. While any particular method might employ the tree branching representation and the associated methods in an ad hoc manner, the proposed means provides a systematic way to apply and implement the associated methods in the most efficient manner possible.

The branching tree structure affords a general method of approximating a stochastic system in a form that affords specific methods of speeding up the computations required to predict its behavior. The methods exploit the nature of the finite state representation to efficiently identify the state and output transitions associated with branching, the branching probabilities. Moreover, once a (state, branch) pair have been encountered and the resulting (state, output) pair have been computed by simulation, the next time this (state, branch) pair is encountered the resulting (state, output) is found by table lookup, a much faster process than simulation.

BRIEF DESCRIPTION OF THE DRAWINGS

Various embodiments are described below with reference to the drawings wherein:

FIG. 9 is a comparison illustrating an advantage in sampling to identify branch probabilities vs leaf outcome probabilities according to the present disclosure; and FIG. 10 illustrates a computer wirelessly downloaded a program product including a machine-readable program code for Discrete-EVent System (DEVS) chips.

Like reference numerals indicate similar parts throughout the figures.

DESCRIPTION OF THE PREFERRED EMBODIMENTS

Figure 1:
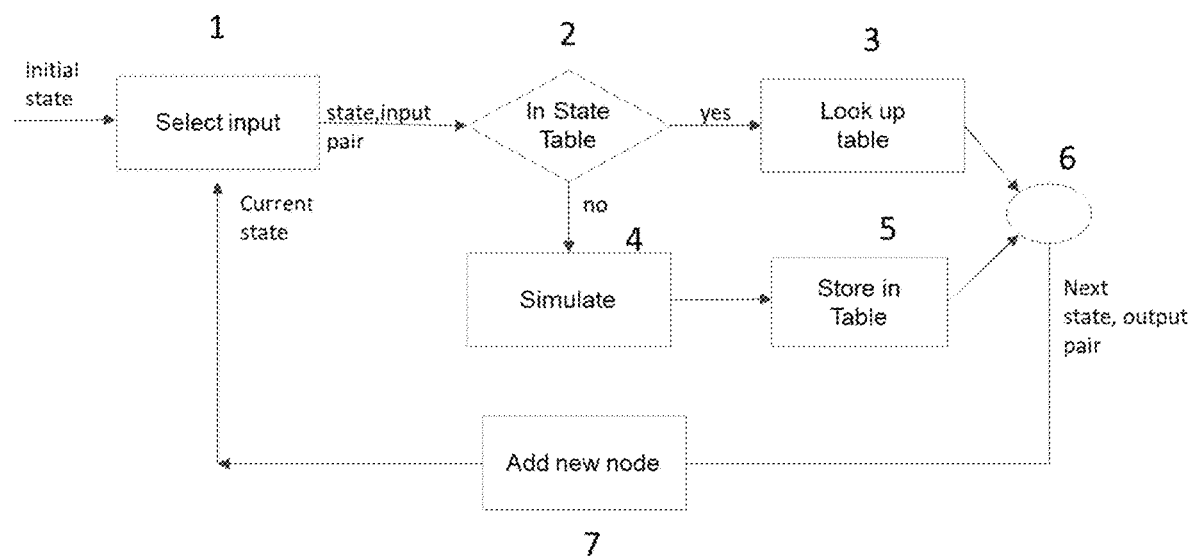
FIG. 1 is a flow block diagram illustrating an example of event patterns according to the present disclosure.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

As shown in FIGS. 1-10, the goal of the invention is to develop a method combining algorithms, tools, software and analyses for a paratemporal solution (called Para-DEVS) that improves upon traditional simulation of large system of system stochastic models with the objectives include: achieve speed-up and scalability as number of random draws increases; enable increased knowledge and statistical significance in scenario outcome/output distributions confidence; and minimize workload for models and simulation infrastructure for users.

This invention expresses the stochastic system in a tree branching structure form. Here successive nodes of the tree each contain a finite state model of the system which maintain information of the state of the system attained to that point and the branches represent decisions made that take the system to subsequent nodes.

The branching tree structure affords a general method of approximating a stochastic system in a form that affords specific methods of speeding up the computations required to predict its behavior. The methods exploit the nature of the finite state representation to efficiently identify the state and output transitions associated with branching, the branching probabilities. Moreover, once a (state, branch) pair have been encountered and the resulting (state, output) pair have been computed by simulation, the next time this (state, branch) pair is encountered the resulting (state, output) is found by table lookup, a much faster process than simulation.

Current methods of stochastic system simulation work with the system representation as given and iteratively track its state from that initially given until a final state or condition of interest has been reached. They must perform a large number of replications of such sample trajectories to achieve statistical significance. While any particular method might employ the tree branching representation and the associated methods in an ad hoc manner, the proposed means provides a systematic way to apply and implement the associated methods in the most efficient manner possible.

Current methods employ Monte Carlo techniques to sample trajectories with enough replications to achieve statistical confidence at the trajectory level. In contrast, the disclosed method samples on the level of individual branches which requires much less time to achieve the same level of confidence.

Further the disclosed method automatically speeds up the computation by filling out the state table and switching to its subsequent use as soon as possible.

The DEVS formalism is a set theory based on the set theory proposed by B. P. ZEIGLER (inventor) in 1976. The DEVS formalism provides a mathematical basis for modeling the discrete event system by module and hierarchical connection. The atomic model representing the system components and the coupled model that can construct a new model by combining several models can be used to represent the system hierarchically and modularly using these two types of models. This object-oriented modeling can increase the reusability, maintainability, and reliability of the model.

Discrete-event system specification (DEVS) is a modeling formalism that can be used to define a system's behavior and structure. DEVS provides a modular and hierarchical formalism for modeling and analyzing event-based systems and uses state-based specifications that can easily be translated into hardware designs. A timed sequence of events can cause changes to the system's state—these events may be external events (e.g., generated by another model) or internal events (e.g., generated by the model itself due to a time event). The system's next states are defined based on the previous state and the event, and the state does not change between events. In the DEVS formalism, a model can be atomic to capture the system component behavior or building blocks of a model. Alternatively, a model can be coupled, involving the combination of and communication between different atomic models, to capture the system structure. In its classic form, the DEVS atomic model can be defined as a 7-tuple with the structure:

$$M = <S, X, Y, \delta int, \delta ext, \lambda, ta>$$

where S is the set of states, X is the set of inputs, Y is the set of outputs, $\delta int$ is the internal transition function that changes the state after an internal event has occurred, $\delta ext$ is the external transition function that changes the state based on the arrival of an external event, $\lambda: S \rightarrow Y$ is the output function, and ta is the time advance function. A system is initially in a start state, and each state has a time advance that dictates the amount of time spent in the state before an internal transition is triggered. Apart from positive real-valued time advance, the time advance may also be zero, offering a convenient construct for transitory states. Finally, an infinite time advance represents passive (inactive) states. An internal transition may trigger an output function whose outputs may cause external transitions on other models' input ports.

FIG. 1 is a flow block diagram illustrating an example of event patterns. A Selection box at 1 selects input which is the branch given the state of the node to be expanded. A Decision box at 2 checks whether the (state, input) pair is a known input to the state table. A State table at 3 returns the corresponding (next state, output) pair if the (state, input) pair is a known input. At a Simulate box at 4, if the (state, input) pair is not known to the state table, a simulation is started to obtain the needed result. Store in a table box at 5 places the (next state, output) pair into the table in association with the (state, input) pair. Join at 6 both paths stemming from the decision box converges. An Add a node box at 7 adds a node at the end the branch selected by the Selection box, setting up the iteration to continue.

Figure 2:
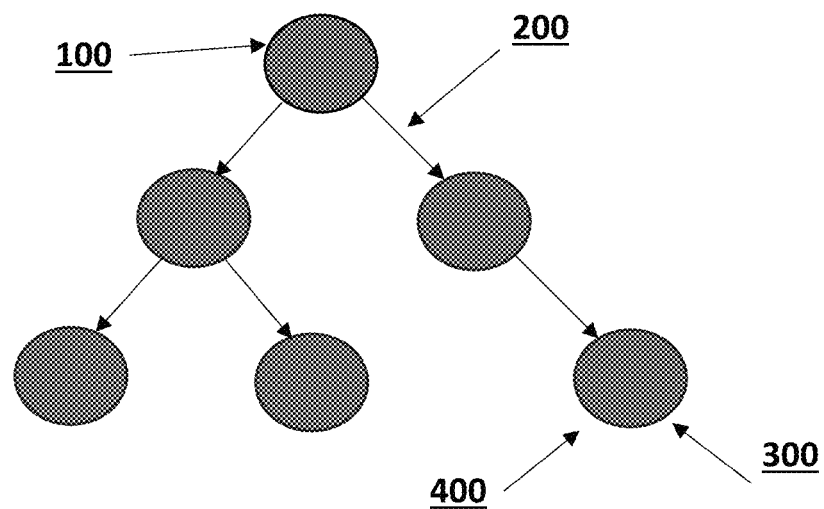
FIG. 2 is a flow node diagram illustrating the example of event patterns according to the present disclosure.

FIG. 2 is a flow tree diagram illustrating an example of an event pattern according to the embodiment. The branching tree structure in FIG. 2 has a Root and nodes that are connected by edges. Each node represents a decision point at 100 where a random variable yields a label for an edge, or branch, to be taken. Each edge holds the probability of taking that branch at 200. A leaf node accumulates the probabilities and values along the path from the root to the leaf at 300. Value is the accumulated values along the path from root to leaf at 400. The branching probabilities are identified by running to the simulation starting from the root node to the set of next decision points. Then the tree branching expansion is executed as described and the values and probabilities accumulated at the leaf nodes are combined to compute the probability distribution of interest to solve the given problem.

Conventional methods employ Monte Carlo techniques to sample trajectories with enough replications to achieve statistical confidence at the trajectory level. In contrast, the disclosed method samples on the level of individual branches which requires much less time to achieve the same level of confidence.

Figure 3:
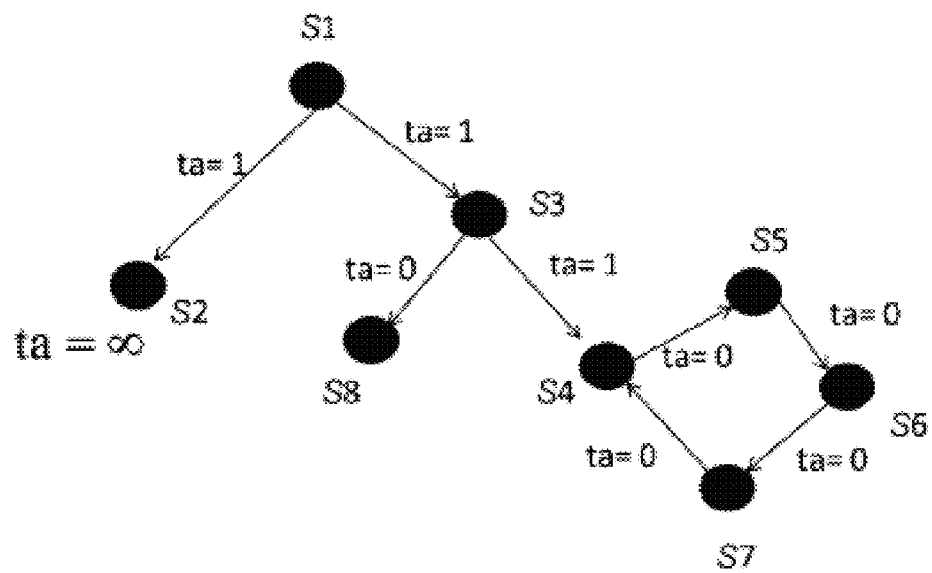
FIG. 3 is illustrating a stochastic model showing a timed non-deterministic model defined at all of its states.

As shown in FIG. 3, a stochastic model is a timed non-deterministic model defined at all of its states. A deterministic model is a timed non-deterministic model deterministic at all its states. Clearly, deterministic models are a subset of stochastic models. In application to Para-DEVS simulation, a non-deterministic state is known as a random draw state. A state trajectory connecting a pair of states's and s' is a sequence s1, s2, . . . , sn which starts with s and ends with s' and satisfies the transition relation, i.e., where s1=s, sn=s' and $\delta$(si, si+1) for i=1, . . . , n−1.

A deterministic state trajectory is a state trajectory containing only deterministic states. The time to traverse a deterministic state trajectory is the sum of the transition times associated with the successive pairs of states in its sequence.

The invention can remove deterministic states from a stochastic model and replace multi-step deterministic trajectories with single step trajectories to represent the effect of cloning simulations. Given a stochastic model, M=<S, $\delta$, ta> it is defined that the reduced model as:

$$M'=<S',\delta',ta'>$$

where
S'$\subseteq$S is the subset of non-deterministic states of M
$\delta'\subseteq$S'×S'={(s, s')| if there is a deterministic state trajectory connecting s and s' }
ta': $\delta'\to R_0^\infty$ where $ta'(s, s') = $ :

$$\begin{cases} ta(s, s') \text{ if both } s \text{ and } s' \text{ are non-deterministic states} \\ \text{the traversal time of the deterministic state trajectory connecting} \\ s \text{ and } s' \text{ if there is such a trajectory.} \end{cases}$$

Figure 4:
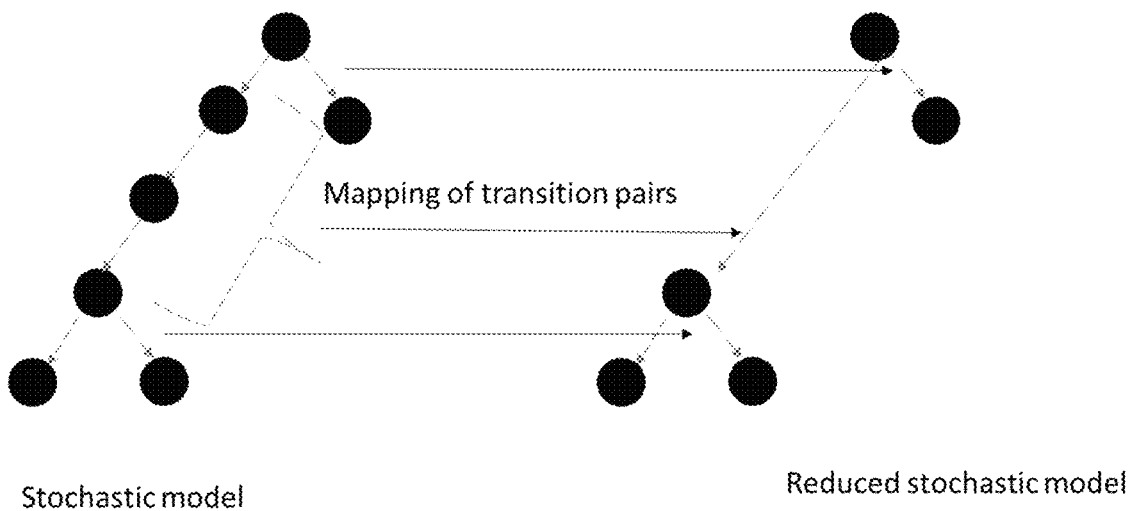
FIG. 4 is illustrating a reduced model showing a homomorphic image of the original.

As shown in FIG. 4, the reduced model is a homomorphic image of the original based on a correspondence restricted to non-deterministic states and multi-step deterministic sequences mapped into corresponding single step sequences.

It is noted that the transversal time from any non-deterministic state to any other is preserved in the reduced version. However, the advantage of constructing this representation is that the computation (in simulation) of a multistep sequence can be replaced by a look up when the branching is subsequently encountered.

As the embodiment, a Stochastic Input-Free DEVS has the structure:

$$MST=<Y,S,G_{int},P\text{int},\lambda,ta>$$

where Y, S, $\lambda$, ta have the usual definitions and $G_{int}$: S$\to 2^S$ is a function that assigns a collection of sets $G_{int}$ (s)$\subseteq 2^S$ to every state s. Given a state s, the collection $G_{int}$ (s) contains all the subsets of S that the future state might belong to with a known probability, determined by a function $P_{int}$: S×$2^S\to$ [0, 1]. When the system is in state s the probability that the internal transition carries it to a set G$\in G_{int}$ (s) is computed by Pint (s, G).

For S finite, it let.

$$P\text{int}(s,G)=\Sigma Pr(s,s')$$

$$S\_\in G$$

where Pr(s, s') is the probability of transitioning from s to s'.

Probability Transition Structure $$PTS=<S,Pr>$$

and
Time Transition Structure $$TTS=<S\tau>$$

gives rise to an Input-Free DEVS Markov Model $$M_{DEV\ S}=<Y,S_{DEV\ S},\delta_{int},\lambda,ta>$$

where $S_{DEV\ S}$=S×[0, 1]$^S$×[0, 1]$^S$
with typical element (s, $\gamma$1, $\gamma$2) with $\gamma$i: S$\to$[0, 1], i=1, 2
where
$\delta_{int}$: $S_{DEV\ S}\to S_{DEV\ S}$ is given by:
$\delta_{int}$ (s, $\gamma$1,$\gamma$2)=s'=(SelectPhase$_{Gint}$ (s, $\gamma$1), $\gamma$1', $\gamma$2')
and ta: $S_{DEV\ S}\to R^+_{0,\infty}$ is given by:
ta(s,$\gamma$1,$\gamma$2)=SelectSigma$_{TTS}$(s,s,$\gamma$2)
and $\gamma$i'=$\Gamma$($\gamma$i), i=1,2

The input-free DEVS Markov Model is introduced as a concrete implementation for non-deterministic models. On the one hand such models are constructible in computational form in such environments. On the other hand, it can explicitly define how such models give rise to non-deterministic models as in the following:

An input free DEVS Markov model $M_{DEV\ S}$=<Y, $S_{DEV\ S}$, $\delta_{int}$, $\lambda$, ta> specifies a non-deterministic model M=<S', $\delta'$, ta'>, where $S'=S_{DEV\ S}$, $\delta'\subseteq$S'×S' is given by: (s1, s2) is in $\delta'$ if, and only if, there exists $\gamma$1 in [0, 1], $\gamma$2 in [0, 1], such that $$\delta_{int}(s1,\gamma1,\gamma2)=s2.$$

and ta': $\delta\to R^\infty_0$ is given by ta'(s1, $\gamma$1, $\gamma$2) for the same pair ($\gamma$1, $\gamma$2) that placed (s1,s2) in $\delta'$.

Essentially, this assertion shows how a transition from state s1 to s2 is possible if there is a random selection of s2 from the set of possible next states of s1 and the time for such a transition is given by a sampling from the distribution for traversal times.

Figure 5:
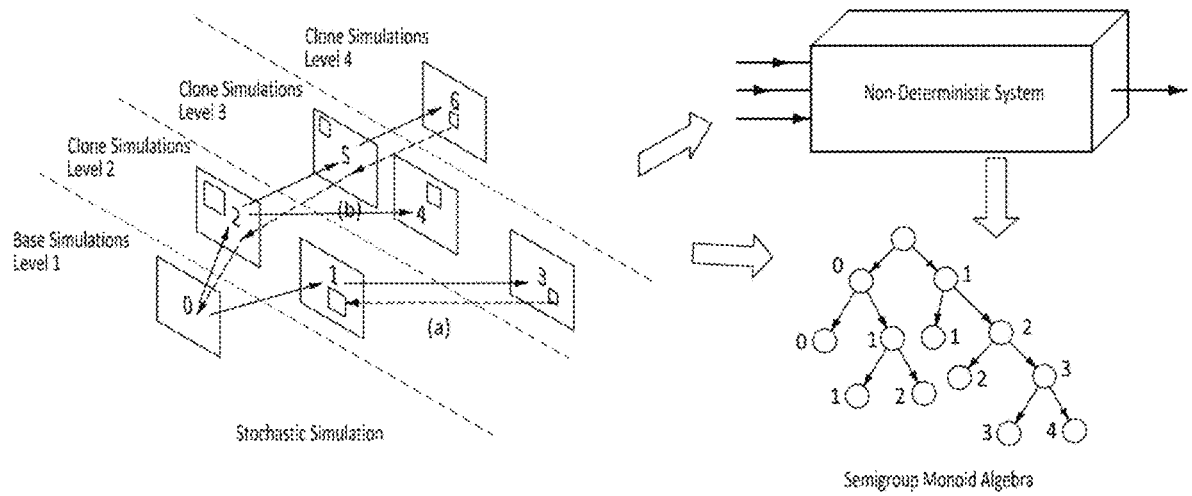
FIG. 5 is illustrating a framework for paratemporal simulation based on system theory and DEVS.

As shown in FIG. 5, it is formulated as a framework for Para-DEVS simulation based on system theory and DEVS. To capture the effect of cloning on the source stochastic simulation, it is considered other representations including concepts of non-deterministic, stochastic, deterministic models and semigroup monoid algebras. It is also defined as a reduced non-deterministic model.

The reduced model is a homomorphic image of the original based on a correspondence restricted to non-deterministic states and multi-step deterministic sequences mapped into corresponding single step sequences.

This result formalizes the reduction in computing time that can be achieved by storing the multistep transition from a draw state to another draw state. When this can be retrieved from a repository it obviates the need to recompute the intermediate steps taken.

The Stochastic Input-Free DEVS is defined as Probability Transition Structure, and Time Transition Structure. On the one hand such models are constructible in computational form in such modeling and simulation environments. On the other hand, it is shown how such models give rise to non-deterministic models, it is shown how a transition from state s1 to s2 is possible if there is a random selection of s2 from the set of possible next states of s1 and the time for such a transition is given by a sampling from the distribution for traversal times.

Figure 6:
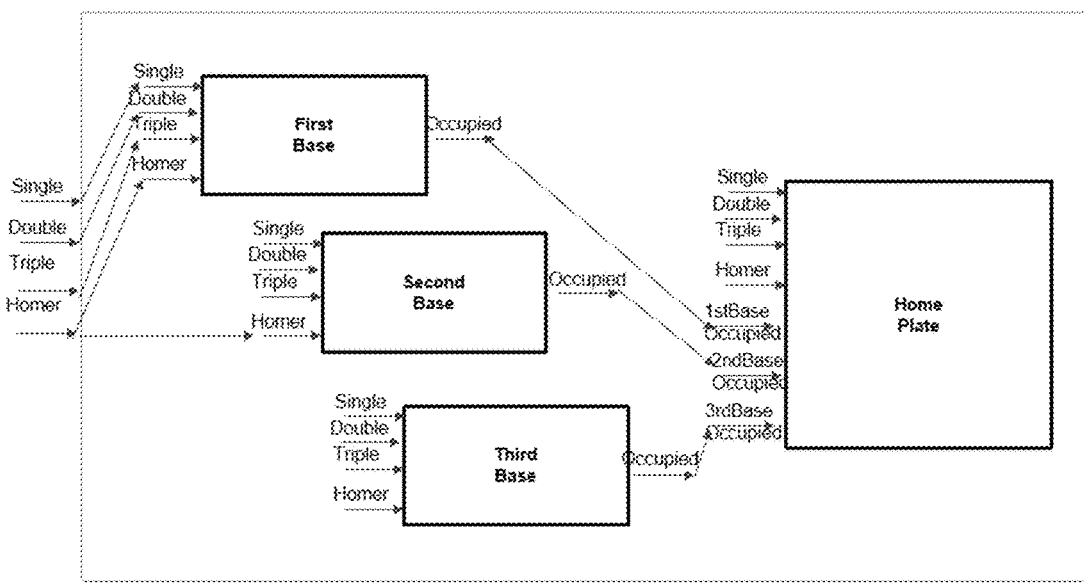
FIG. 6 is an illustration of the coupled model representation of the baseball game as implemented in a system.

Embodiments of the invention described herein are implemented as a baseball game as an example. The baseball game is integrated into DEVS simulator and obtains data for abstract model, cross-verification and validation of models. FIG. 6 illustrates the coupled model representation of the baseball game as implemented in a system, the DEVS-based modeling and simulation environment developed by inventor. The FIG. 6 reflects a focus on the set of batter outcomes {Single, Double, . . . } as random draw decisions to be exposed in line with the proposed methodology. At this level of resolution, the state of the game as perceived by a batter is configuration of the bases {First base, Second base, Third base} in {Empty, Occupied} condition thus forming 8 configuration The DEVS coupled model in FIG. 6 has components for each base which adjust their respective occupation states in accordance with the rules governing the effects of batter outcomes which become inputs to the model. states. Also included is a component representing home plate that is continually updated on the states of the bases and computes runs scored as determined by the rules.

Figure 7:
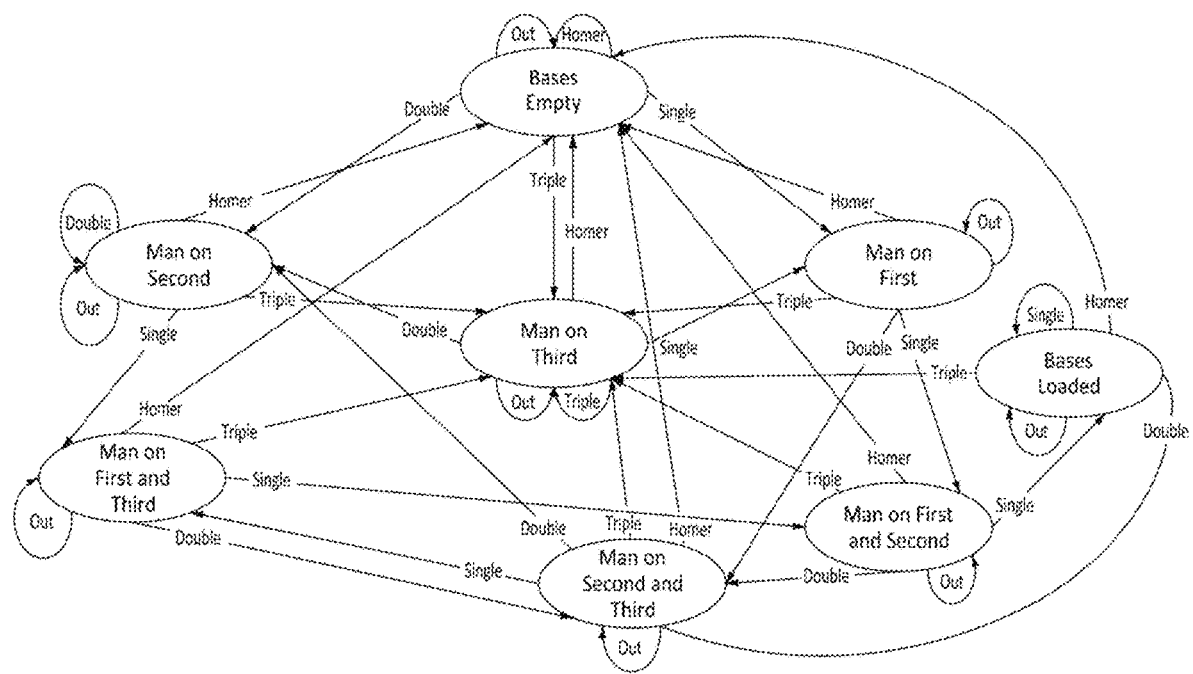
FIG. 7 is a flow chart illustrating a coupled Model representation of a Baseball Game.

As shown in FIG. 7, coupled Model representation of Baseball Game: Each node represents a batter along with the state of the game; State of the game={runners on bases}, Input=Batter outcome={single, double, . . . }, Output=Runs scored; Branching corresponds to random variable outcome of the batter.

As shown in FIG. 7, the coupled model of DEVS-based framework for Para-DEVS Simulation can be encapsulated in a system specification at the state system level in the form of a Mealy Machine [1]:

$$M=<X,S,Y,\delta,\lambda>$$

X={out, single, double, triple, homer}
S={BasesEmpty, . . . , BasesLoaded}
Y=Non-negative integers
$\delta(s,x)$=as shown in FIG. 7
$\lambda(s,x)$=runs scored in transition caused by batter outcome on state (e.g., a homer acting on bases loaded state causes 4 runs to be scored.)

The branching tree expansion potentially affords much greater speedup and scalability than the baseline approach of generating individual state trajectories. In examining this comparison, it is realized that the system state table exemplified by the Mealy machine could significantly speed up the computation by replacing simulation by table lookup. This would be especially applicable to tree expansion since it offers many more opportunities for reuse of earlier encountered computations. The implementation of this idea is illustrated in FIG. 7 and summarized as follows:

Define the disclosure depth=minimum depth of branching tree such that all states are accessible
The state table can be completely filled out by simulating to disclosure depth+1
The computational cost of table inclusion=cost of initial additional state table construction,
The benefit=reduction in tree expansion time afforded by lookup vs simulation.

In application to the baseball game, it observes up to 2300 speedup for tree expansion for depth up to 7 (also tree expansion without table lookup could not exceed depth 7 vs with table lookup could continue to depth 9).

Figure 8:
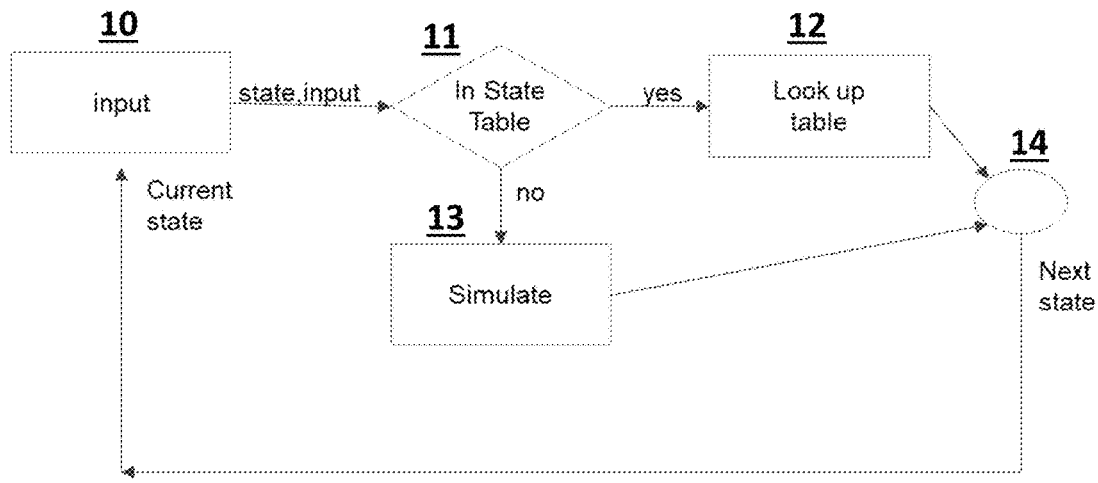
FIG. 8 is a workflow illustrating the example of event patterns in a Baseball Game according to the present disclosure.

FIG. 8 sets up a workflow to compare a) identifying the branch (batter outcome) probabilities of the model and subsequently using the model in predictive form and b) simulating the given stochastic system to get the same level of statistical significance as baseline. An Input box 10 provides a state to a In State Table 11. The In State Table 11 is a decision box and decides to go to a Look Up table box 12 if the decision is Yes. If the decision is No, the next step goes to a Simulate box 13. A Join box 14 joins with the Look up table 12 and Simulate 13. The Join box 14 provides a next state as a current state. This comparison is illustrated in FIG. 9, where the advantage in sampling to identify branch probabilities vs leaf outcome probabilities for the same statistical significance is shown to be the ratio of computation time to get a sample for a leaf outcome (i.e., number of runs scored in a 9 inning game) to the time needed to get a sample to estimate the branching probabilities. To get a game sample requires at least 27 batter outcomes (we assume 30 for simplicity) while one batter outcome gives an estimate of the branching probabilities. Thus, the expected speedup of the model-based approach is in the order of 30 fold.

In addition, it is considering the approximation introduced in the simplification of the rules made to assume that the transition and output functions of the Mealy machine could be taken as single valued (which corresponds to assuming that the underlying system is deterministic.) For example, the assumption that an out does not change the state of the field can be violated by a sacrifice fly ball or bunt in which the batter is out but the runner advances. Also, a double play not only causes the batter to be out but also the runner on first base. How such approximation can be accounted for using approximate morphism concepts. This approach sets up the mechanism to address such questions as "How does error propagate?", "How big a difference does it make in final outcome?".

To implement the ParaDEVS prototype requires the following behaviors: Enable DEVS model to detect encounter of random draw states; Inform simulator of the branching point; Provide the branch probabilities; Store state information.

The implementation requires us to design tree-like structures to support cloning, state merging, and exploration as discussed above. Also, it seeks a design that minimizes the amount of information that the user has to provide beyond the basic model. To do so, it is considered exploiting:

Modular separation of DEVS model and simulator.
Its existing simulator implementation based on well-defined DEVS abstract simulator and Object-oriented principles.
Java reflection class properties (Java program can "introspect" and manipulate class attributes and methods while executing.)

FIG. 10, the system of the present invention may include at least one computer 501 with a user interface. The computer may include any computer including, but not limited to, a desktop, laptop, and smart device, such as, a tablet and smart phone. The computer 501 includes a computer software program product including a non-transitory machine-readable program code for causing, when executed, the computer to perform steps. The program product may include software which may either be loaded onto the computer or accessed by the computer. The loaded software may include an application on a smart device. The software may be accessed by computer using a web browser 502. The computer may access the software via the web browser using the internet 500, extranet, intranet 504, host server 505, internet cloud 503 and the like.

The computer-based data processing system and method described above is for purposes of example only and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

Where this application has listed the steps of a method or procedure in a specific order, it may be possible, or even expedient in certain circumstances, to change the order in which some steps are performed, and it is intended that the particular steps of the method or procedure claim set forth herein below not be construed as being order-specific unless such order specificity is expressly stated in the claim.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A method for improving a DEVS simulation of stochastic systems, the method comprising:
   expanding states of nodes from DEVS models, wherein the expanded states of nodes have a branching tree structure, and the expanded states are connected to each other by labelled branches of the tree, wherein labels represent possible random choices to make at each node wherein an input state is selected among expanded states of nodes from the DEVS models;
   tracking nodes with probabilities and values, wherein leaf nodes accumulate the probabilities and values along paths from a root to leaves in the tree;
   providing the leaf nodes with a decision process to aggregate the accumulated probabilities and values to resulting statistics of interest concerning the DEVS simulation;
   determining whether a next expanded node represents a known state that has already been computed and the result stored in a lookup table,
   wherein the lookup table replaces a computation in simulation to speed up a prediction of an outcome behavior in DEVS simulation; and
   initiating a DEVS simulation to expand the node which has not already been computed and the result stored in a state table, wherein the DEVS simulation of stochastic systems has a 7-tuple with a structure including a set of inputs, a set of outputs, an internal transition, an external transition, an output function, and a time advance function.

2. The method of claim 1, further comprising initiating a DEVS simulation to obtain a result when the input state is not a known input state stored in the lookup table.

3. The method of claim 2, further comprising storing the result into the state table as a next state.

4. The method of claim 3, further comprising joining paths from a corresponding input state and the next state.

5. The method of claim 4, further comprising adding a node from the joined paths.

6. The method of claim 1, wherein state and branch are a pair and encountered a resulting pair, wherein the input state and output are a resulting pair, and wherein the resulting pair is computed by the DEVS simulation of stochastic systems.

7. The method of claim 1, wherein the node is one of a leaf node or a root.

8. The method of claim 7, wherein the nodes are connected by edges in the branching tree structure.

9. The method of claim 1, where the internal transition carries the probabilities and values to the resulting statistics of interest concerning the DEVS simulation.

10. A system for improving a DEVS simulation of stochastic systems, the system comprising:
    a processor and memory storing instructions executable by the processor to:
    expand states of nodes from DEVS models, wherein the expanded states of nodes have a branching tree structure, and the expanded states are connected to each other by labelled branches of the tree, wherein labels represent possible random choices to make at each node, wherein an input state is selected among expanded states of nodes from the DEVS models;
    track nodes with probabilities and values, wherein leaf nodes accumulate the probabilities and values along paths from a root to the leaves in the tree;
    provide the leaf nodes with a decision process to aggregate the accumulated probabilities and values to resulting statistics of interest concerning the DEVS simulation;
    determine whether a next expanded node represents a known state that has already been computed and the result stored in a lookup table,
    wherein the lookup table replaces a computation in simulation to speed up a prediction of an outcome behavior in DEVS simulation; and
    initiate a DEVS simulation to expand the node which has not already been computed and the result stored in a state table wherein the a DEVS simulation of stochastic systems has a 7-tuple with a structure including a set of inputs, a set of outputs, an internal transition, an external transition, an output function, and a time advance function.

11. The system of claim 10, further comprising start a process of a DEVS simulation to obtain a result when the input state is not a known input state stored in the state table.

12. The system of claim 11, further comprising store the result into the state table as a next state.

13. The system of claim 12, further comprising join paths from a corresponding input state and the next state.

14. The system of claim 13, further comprising add a node from the joined paths.

15. The system of claim 10, wherein state and branch are a pair and encountered a resulting pair, wherein the input state and output are a resulting pair and wherein the resulting pair is computed by the DEVS simulation of stochastic systems.

16. The system of claim 15, wherein the nodes are one of a leaf node or a root.

17. The system of claim 16, wherein the nodes are connected by edges in the branching tree structure.

18. The system of claim 10, where the internal transition carries the probabilities and values to the resulting statistics of interest concerning the DEVS simulation.

\* \* \* \* \*